Figure 3:
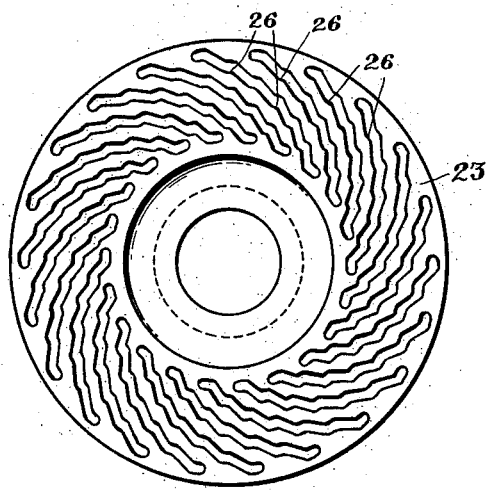

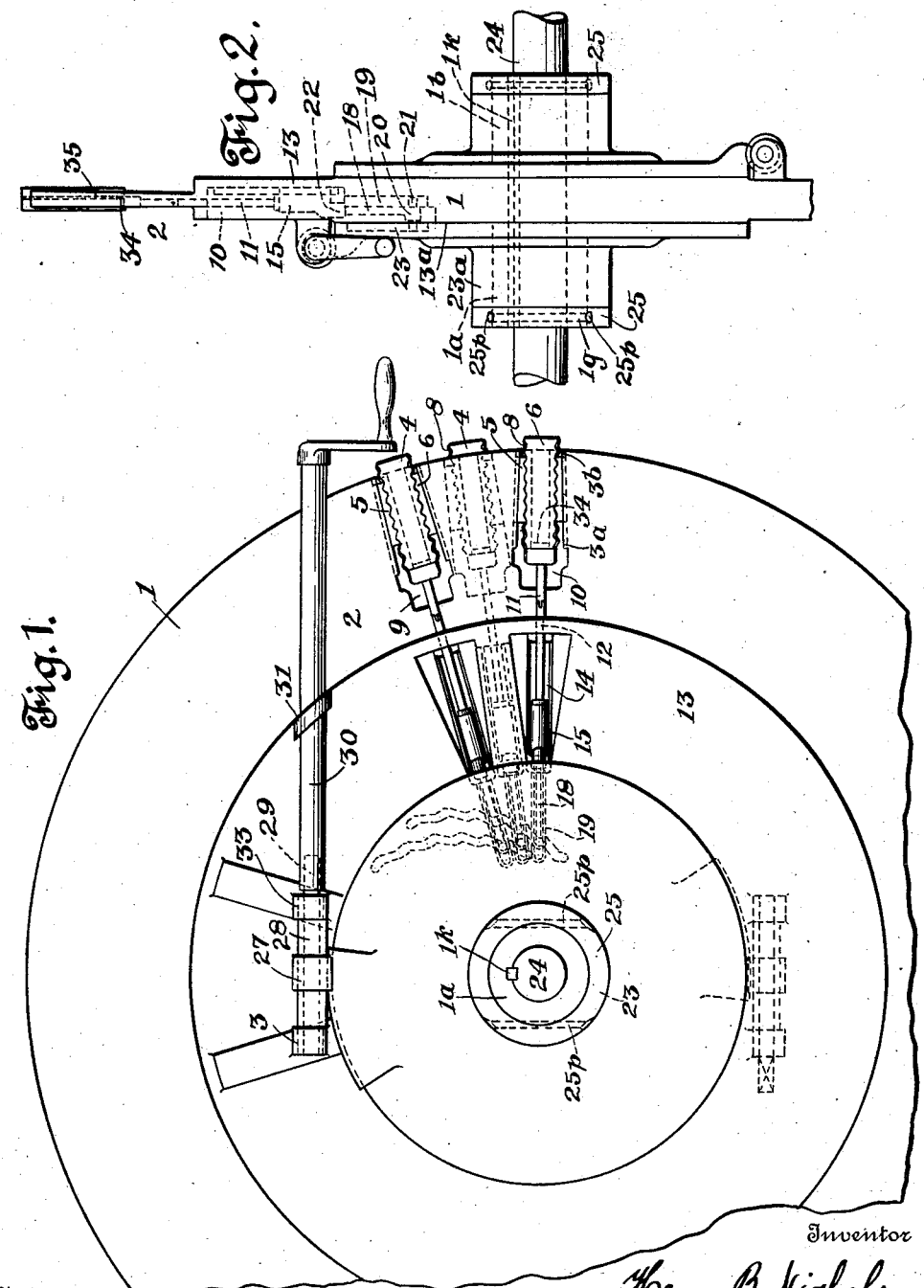

H. B. NICHOLS.
SAW.
APPLICATION FILED MAY 25, 1910.

1,021,551.

Patented Mar. 26, 1912.

2 SHEETS—SHEET 2.

Witnesses

Inventor
Henry B. Nichols
By Edward E. Clement
Attorney

COLUMBIA PLANOGRAPH CO., WASHINGTON, D. C.

UNITED STATES PATENT OFFICE.

HENRY B. NICHOLS, OF PHILADELPHIA, PENNSYLVANIA.

SAW.

1,021,551.  Specification of Letters Patent.  Patented Mar. 26, 1912.

Application filed May 25, 1910. Serial No. 563,351.

*To all whom it may concern:*

Be it known that I, HENRY B. NICHOLS, a citizen of the United States, residing at Philadelphia, county of Philadelphia, and State of Pennsylvania, have invented certain new and useful Improvements in Saws, of which the following is a specification, reference being had therein to the accompanying drawing.
My invention relates to metal cutting tools, and their method of manufacture.

It has for its object the production of a saw which will cut very hard steel rails and the like.
Heretofore it has been necessary to cast manganese steel rails of the exact length wanted in each case, because there has been no saw available which would make any substantial impression on this steel. In casting, the patterns and consequently the product are usually gated at one end, and as it has been impossible to cut the material there has always been a flaw or bur left on each rail when the gate was broken.
There are certain abrasive materials, such as emery and carborundum, which successfully attack these hard steels, but so far as I know there has never been a grinding wheel or other abradant tool which could be adapted for the purpose of cutting rails or other objects, without enormous waste; and for this reason, as already stated, such rails are still cast.

In order to be successful for my purpose, a wheel or saw must have a large diameter, which means a high peripheral speed, if reasonable efficiency be desired. Moreover, since the cut will be deep there must be clearance, so there must be the equivalent of the offset teeth in the ordinary saw. According to ordinary practice, this would indicate a radially fluted grinding wheel of emery, carborundum, or similar material four or five feet in diameter, and relatively thin inside the rim. It will be at once apparent without any elaborate mathematical demonstration, that such a wheel is totally impracticable, because at anything like high speeds the centrifugal force developed would be greater than any known composition would stand, even if reinforced with metal wire or the like in accordance with suggestions heretofore made in other connections.
I solve the problem by providing a saw with a steel body and separate teeth formed as inserts of abrasive material. I get the clearance effect by alternating the teeth on opposite faces of the steel body, and in order to compensate for the unavoidable wear on the teeth of such abrasive material I provide carefully balanced adjusting means which will remain securely locked during operation of the saw, but can be readily and quickly manipulated to change the adjustment when the device is at rest.

My invention is illustrated in the accompanying drawings, in which—

Figure 6:
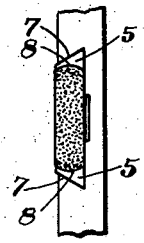
Figure 4:
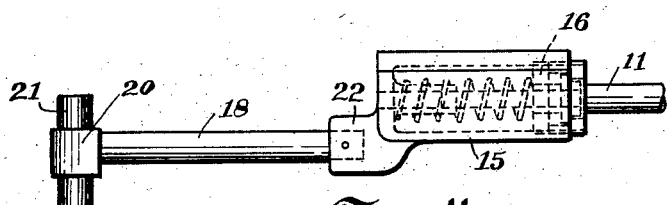
Figure 5:
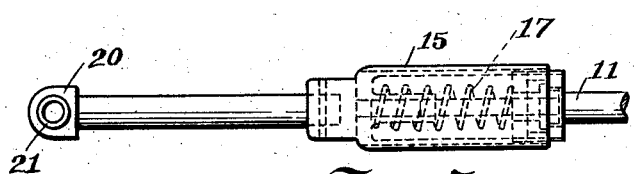

Figure 1 is a face view of a saw embodying my invention. Fig. 2 is an edge view thereof, both figures being partly broken away for economy of space. Fig. 2$^a$ is a detail sectional view on an enlarged scale of certain parts of Fig. 2. Fig. 3 is a bottom view of the cam plate removed. Figs. 4 and 5 are respectively a side and a plan view of an abutment rod and plunger for one of the abrasive teeth. Fig. 6 is a detailed view on an enlarged scale showing the end of one abrasive tooth, and the manner in which it is maintained in position.

Before proceeding to a detailed description of the drawings I may state generally that my saw comprises as its essential features a disk of crucible steel 4′ 11″ in diameter, with 22 radial key ways or shallow slots cut in each of its faces around the circumference, a tooth of abrasive material keyed in each slot, a spring pressed follower behind each tooth, and a pair of cam disks adjustable by means of tangential worms, on opposite faces of the main saw disk, with spiral cams acting when the disks are turned to advance the followers and maintain a constant spring pressure on the teeth to force them outwardly from the center and prevent their falling out of the slots when the saw is run at low speeds.

Referring to the drawings, 1 designates a disk of crucible steel, 4′ 11″ in diameter, 2½″ thick at the center, a little less than 1″ thick around its periphery, and extending 10″ inside the same. This thin portion 2 forms the cutting edge of the tool, and in its opposite faces are cut key slots 3 to receive the cutting or grinding teeth 4 which extend outward ½″ beyond the peripheral line, so as to make the cutting circle 5′ in diameter. There are 22 key slots and teeth on each side of the disk; those on one side alternating with those of the other around the circle. The pitch or distance between centers on the 59″ diameter of the steel body, is 8.425″. The dimensions of each tooth 4 are 6″x1⅞″x1 5/16″. With these dimensions it has been found that the cutting effect on very hard steel is more satisfactory than it would be with a mechanically continuous wheel having the same length of cutting surface and assuming that the continuous operation of such a wheel would be possible.

The manner in which teeth are secured in the key slots will be best understood from Figs. 1 and 6. Each slot 3 tapers outwardly, that is to say toward the periphery of the disk. To illustrate, at the inner end 3ᵃ it is 2¾″ wide, and at the outer end 3ᵇ it is 2 1/32″. As the tooth is of uniform width throughout its length, there is a clearance on each side, which permits of the introduction of a pair of keys or tapered shims 5 and 6. The edges of the key slot are undercut, as shown at 7 in Fig. 6 and indicated by the dotted lines 7 in Fig. 1. The opposite edges of the tooth are rounded or beveled on the two faces, as shown at 8 in Fig. 6, and indicated by the double lines 8 in Fig. 1. Each key or shim 5 and 6 is made with its outer and inner faces respectively made to fit under the edge of the key slot, and over the edge of the tooth. As the keys are tapered, and the slot is tapered, any force tending to push the tooth outwardly will jam it securely in the slot, and prevent either radial or lateral displacement. Initially this force is supplied to each tooth by a follower 9 lying in a chamber 10 and carried on the outer end of a rod 11 which passes inward through an opening 12 in the thickened portion 13 of the disk 1, and thence into a radial chamber 14 formed in said thickened portion where its inner end is received and held in a spring box 15 which is best shown in Figs. 4 and 5. The rod has a collar or head 16 which receives the thrust of a coil spring 17 housed in the box. This box is itself carried upon a rod 18 which extends inward through a supplemental radial chamber 19 formed in the thickened portion of the disk, and at its inner end carries a cross head 20 with a pair of oppositely projecting gudgeons 21 having a common axis perpendicular to the axis of the rod 18. The outer end of this rod 18 is pinned in a socket in an offset boss 22 on the box 15. The purpose of offsetting this boss or lug 22, (which is best shown in Figs. 2 and 4) is to bring the axis of the rod 18 out of line with and above that of the rod 11, so that the outer face of the head 20 will lie substantially flush with the surface 13ᵃ of the central portion of the main disk 1. Superimposed upon this main disk is the cam disk 23 (the relation of these parts is best shown in Fig. 2). This cam disk is secured so as to rotate upon the main disk in the following manner: The disk 1 has a central hub with projecting ends 1ᵃ and 1ᵇ, which is keyed to the shaft 24 as indicated at 1ᵏ in Figs. 1 and 2. The disk 23 has a central hub or collar 23ᵃ fitted over the end of the hub 1ᵃ, and locked against end motion thereon by means of a friction or locking ring 25 secured on the hub 1ᵃ by tapered tangent pins 25ᵖ taking into opposite sides of the annular groove 1ᵍ in the hub 1ᵃ. These pins are driven out when it is desired to remove the ring and disk, and are set up tightly at all other times.

In the inner face of the disk 23 (as shown in Fig. 3) are formed a set of spiral grooves, which receive the gudgeons 21 on the upper sides of the cross heads 20. The opposite gudgeons fit into radial grooves in the body of the disk 1. Now it will be observed that the teeth 4 are serrated along their sides, and the keys or shims are correspondingly serrated. In the machine illustrated, each tooth has 7 positions, that is to say it can be fed outwardly 7 steps, each approximately ¼″ in length, and each accomplished by drawing back and lifting out the tooth, then setting it forward one tooth in its shims. In order to hold the teeth in position when the saw is stationary or running at low speeds, the spring-pressed rod 11 is provided as already described. The inner end of the spring 17 of this rod abuts on the inside end of the box 15, and its thrust is transferred thence through the rod 18 and the gudgeons 21 to the shoulders 26 formed at intervals in each spiral groove. These grooves therefore serve to maintain the tension on the spring constant for all positions of the tooth. The feed is effected by means of a worm 27 on a shaft 28, which has a squared end 29, to receive a socket wrench 30 which extends through a guide ring 31 on the disk 1 and is turned by means of a handle 32. The worm 27 engages teeth cut in an arc of the circumference of disk 23, and as the bearing abutments 33 of the shaft 28 are secured to the main disk, the rotation of this shaft will therefore serve to move the rods 18 in or out according to the direction of rotation. One of these worm shafts is provided on each side of the disk 1, and they are located diametrically opposite to each other with respect to the center of the main shaft, thus insuring a balance of masses during rotation.

In the bottom of each key slot, underlying the tooth when in position, is a shallow groove 35 which receives the end of a tongue 34 on the follower 9. Thus the follower is held down by the tooth while the latter is in position, and this enables me, for convenience, to joint the rod 11, so that in resetting the teeth it is sufficient to press back the follower and lift it up in order to release the tooth.

The normal speed of this saw in operation is 1,000 revolutions per minute, which gives a surface speed of 15,700' per minute. There are 44 teeth, each 2½" wide, and the work done is therefore equivalent to that of a 19" solid wheel running at about 8,600 revolutions per minute.

I expedite the operation of resetting the teeth by fixing a gage on the saw table to which each tooth can be brought in turn by rotating the disk. This comprises a simple hole or socket for a stop, in addition to which I provide holes for staples in the teeth and shims, so as to hold them together while adjusting, thus saving time lost by accidental separations and displacements.

The real function of the springs 17 is to keep the teeth from dropping out when the wheel is standing still or running at low speeds. The thrust of each spring is 90 pounds, which is enough to hold its tooth in place up to 800 revolutions per minute, after which centrifugal force may be relied upon to throw the teeth outward. After adjusting, it is of course necessary to trim the wheel so as to produce a truly circular periphery. This is done at low speeds, but the springs 17 do no work at any other time.

It will be evident to those skilled in the art that divers changes and modifications may be made in the design herein described and illustrated, without departing from the spirit of my invention. It has heretofore been impossible to cut steel rails of the extreme hardness demanded in modern practice with any of the appliances heretofore available and within my knowledge. Ordinary abrasive wheels cannot be used, because if made of a diameter large enough to be useful, they cannot safely be rotated at high speeds. I believe the combination of a steel body, which gives the necessary strength and resistance to disruption due to centrifugal force, with abrasive teeth which give the desired cutting effect, is original with me, and I shall therefore claim it broadly as well as specifically, and desire my claims to be given a scope commensurate with the real scope of the invention.

Having thus described my invention, what I claim and desire to secure by Letters Patent of the United States, is:

1. A machine of the class described comprising a steel disk, with teeth formed separately of abrasive material, secured at intervals around the periphery of the disk and overlapping each other in their paths of movement.

2. A machine of the class described comprising a steel disk, with teeth formed separately of abrasive material, secured at intervals around the periphery of the disk, and overlapping each other in their paths of movement, and alternate teeth projecting from opposite sides of the disk, so as to effect a clearance during the cut.

3. A saw for cutting very hard materials comprising a steel disk and teeth formed separately of abrasive material secured at intervals around the periphery of the disk, alternate teeth projecting from opposite sides of the disk, and having their lateral surfaces as well as their peripheral surfaces exposed, so as to effect a clearance during the cut.

4. A saw for cutting very hard materials, comprising a steel disk, with teeth formed separately of abrasive material and secured at intervals around the periphery of the disk, adjustable locking means for said teeth adapted to be held locked by centrifugal force at high speeds, and means for maintaining the same locked at low speeds of the saw.

5. A saw for cutting very hard materials, comprising a steel disk, with teeth formed separately of abrasive material and secured at intervals around the periphery of the disk, and adjustable locking means for said teeth adapted to be held locked by centrifugal force at high speeds, and spring pressed followers acting radially upon the teeth so as to keep them locked at low speeds.

6. A saw for cutting very hard materials comprising a steel disk having radial key slots cut around its periphery with alternate slots on opposite sides thereof, said slots tapering in width from the center toward the circumference, a plurality of teeth formed separately of abrasive material with parallel sides of a width somewhat less than the narrowest portion of a slot, and tapered keys adapted to be inserted with the teeth of abrasive material in the slots, said keys also tapered from the center toward the circumference of the disk, whereby the effect of centrifugal force at high speeds will be to lock the teeth in their slots against any accidental displacement.

7. A saw for cutting very hard materials, comprising a steel disk having a plurality of undercut radial slots alternating on opposite sides around its periphery, a corresponding plurality of teeth formed separately of abrasive material with serrated edges, and a plurality of tapered keys adapted to fit beneath the undercut edges of the slots on the one side, and to fit the serrations of the teeth on the other.

8. A saw for cutting very hard materials, comprising a steel disk having tapered radial slots alternating on opposite sides around its periphery, a corresponding plurality of teeth, formed separately from abrasive material and adapted to lie in said slots, tapered keys for each slot adapted to lock its tooth in position, and a spring follower mechanism adapted to hold the tooth in such position, comprising a radial rod with a head on its outer end engaging the inner end of the tooth and its inner end engaged by a compression spring, with means for confining said spring.

9. A saw for cutting very hard materials, comprising a steel disk having tapered radial slots alternating on opposite sides around its periphery, a corresponding plurality of teeth formed separately from abrasive material and adapted to lie in said slots, tapered keys for each slot adapted to lock its tooth in position, and a spring follower mechanism adapted to hold the tooth in such position, comprising a radial rod with a head on its outer end engaging the iner end of the tooth and its inner end engaged by a compression spring, with a box for said spring and an adjustable support for said box.

10. A saw for cutting very hard materials, comprising a steel disk having tapered radial slots alternating on opposite sides around its periphery, a corresponding plurality of teeth, formed separately from abrasive material and adapted to lie in said slots, tapered keys for each slot adapted to lock its tooth in position, and a spring follower mechanism adapted to hold the tooth in such position, comprising a radial rod with a head on its outer end engaging the inner end of the tooth and its inner end engaged by a compression spring, with a box for said spring, and an adjustable abutment for the box carried on the main disk and adapted to be moved so as to feed the box forward as the tooth is consumed and fed, thereby maintaining constant tension on the spring and constant pressure on the tooth.

11. A saw with adjustable insertible teeth, comprising a disk body having radial slots around its periphery, a tooth fitted to each slot, a radial follower for each tooth carried by the disk, and step by step means for advancing all of said followers simultaneously as the teeth wear.

12. A saw with adjustable insertible teeth, comprising a disk body having radial slots around its periphery, a tooth fitted to each slot, a radial follower for each tooth carried by the disk, step by step means for advancing all of said followers simultaneously to compensate for wear on the teeth, and means for locking each tooth at each step in advance.

13. A saw with adjustable insertible teeth, comprising a disk body having radial slots around its periphery, a tooth fitted to each slot, a radial follower for each tooth carried by the disk, a gudgeon on each follower, and a common disk carried by and concentric with the main disk, containing helical slots to receive said gudgeons, whereby a rotation of the disk will produce simultaneous radial feed of the followers.

14. A saw with adjustable insertible teeth, comprising a disk body having radial slots around its periphery, a tooth fitted to each slot, a radial follower for each tooth carried by the disk, a radial slot in the main disk corresponding to each follower, a supplemental disk carried by and concentrically adjustable on the main disk, a series of helical slots on the inner face of said supplemental disk, one slot for each follower, and a pair of gudgeons connected to each follower, one lying in the radial slot on the main disk, and the other lying in the helical slot in the supplemental disk, whereby rotary adjustment of the supplemental disk with respect to the main disk will produce simultaneous adjustment of all the followers.

15. A saw with adjustable insertible teeth, comprising a disk body having radial slots around its periphery, a tooth fitted to each slot, a radial follower for each tooth carried by the disk, a supplemental disk concentrically mounted for rotary adjustment on the main disk, cam surfaces on said supplemental disk with coöperating members connected to the followers, and means carried on the main disk for rotating and locking said supplemental disk.

16. A saw comprising a main disk or body, a plurality of insertible teeth carried in radial slots around the periphery of the body, a plurality of radial followers for the teeth, and adjusting means for the followers comprising a pair of supplemental disks carried on the opposite faces of the main disk, and concentrically adjustable thereon, with locking and adjusting means for said supplemental disks carried on the main disk at points 180° apart, so as to balance during rotation.

17. A saw comprising slots formed around each side of its periphery, a corresponding plurality of insertible teeth adjustably secured in said slots, a corresponding plurality of holding devices for said teeth, a pair of adjusting and locking disks on opposite faces of the main disk for said holding devices, and locking means for said adjusting disk.

18. A saw comprising slots formed around each side of its periphery, a corresponding plurality of insertible teeth adjustably secured in said slots, a corresponding plurality of holding devices for said teeth, a pair of adjusting and locking disks on opposite faces of the main disk for said holding devices, and separate actuating and locking means for said adjusting disks, carried on opposite sides of the main disk at points 90° apart so as to produce balanced masses during rotation.

19. A saw comprising a main disk or body having radial slots around its periphery, insertible teeth adjustably secured in said slots, radial holding means carried on the main disk and abutting against said teeth, a supplemental disk concentrically mounted on the main disk and when rotated acting upon said holding means, and a screw adjuster carried on the main disk with its threads engaging threads formed on the supplemental disk, whereby the latter may be both actuated and locked in adjustment.

In testimony whereof I affix my signature in presence of two witnesses.

HENRY B. NICHOLS.

Witnesses:
   GEO. B. TAYLOR,
   CHAS. V. LOUDERNS.

Copies of this patent may be obtained for five cents each, by addressing the "Commissioner of Patents, Washington, D. C."